Patented Oct. 25, 1927.

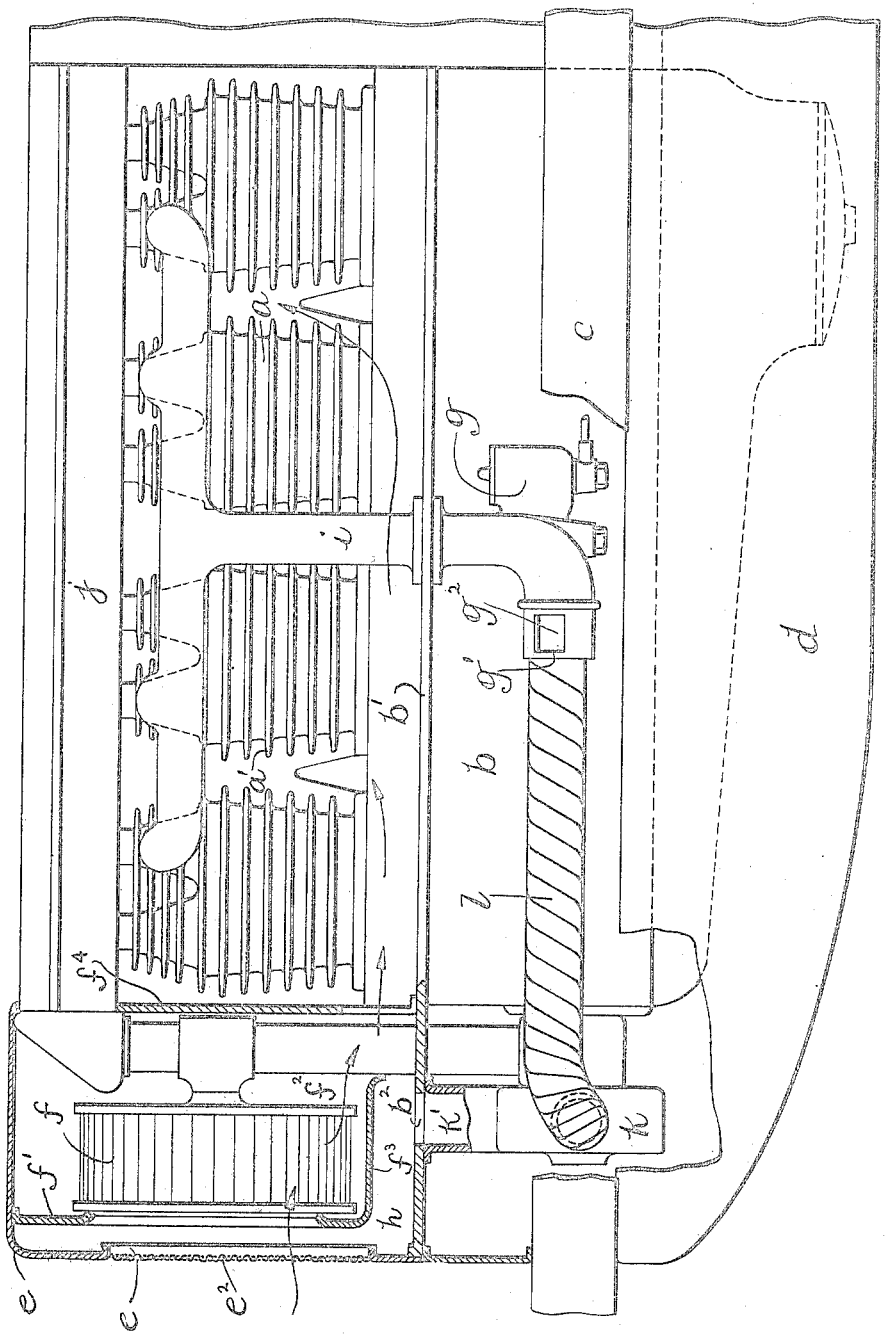

1,646,757

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

SUPERCHARGING DEVICE.

Application filed December 21, 1925. Serial No. 76,680.

This invention relates to a supercharger for internal combustion engines, that is, the invention has to do with the provision of means for supplying air to the carbureter of such an engine at a pressure greater than that of the surrounding atmosphere. More specifically, the invention relates to a supercharger for the internal combustion engine in a self-propelled vehicle and has for one of its objects to so arrange the supercharging device and its associated parts as to take advantage of the increased head due to the motion of the vehicle in building up a pressure on the air fed to the carbureter. Accordingly, the engine is disposed within an enclosure having an opening at the front end through which the air enters as the vehicle moves forward and within which a pressure is built up which is availed of to supplement the fan or compressor pump directing air to the carbureter. More particularly the invention relates to a supercharger for the carbureter of an air cooled engine wherein a fan is relied upon to induce a current of air into the enclosure through the opening and the air under pressure thus induced is availed of by the compressor pump.

The invention also has for its object to proportion the compression of the air fed to the carbureter in accordance with the necessities of the engine. To this end the compressor pump is directly driven by the engine, so that as the engine speed increases the volume of air to the carbureter increases.

In order that the invention may be clearly understood and readily carried into effect the same will now be described more particularly with reference to the accompanying drawing illustrating a preferred embodiment thereof and in which the supercharger is shown as applied to an internal combustion engine of the air cooled type serving as the prime mover of a self propelled vehicle.

The invention is not to be deemed limited to any particular type of engine or to a particular application of engine. In the drawing a multi-cylinder internal combustion engine of the air cooled type is illustrated comprised of a plurality of cylinders $a$, preferably having cooling fins $a'$, and united with a common crank case $b$ which is supported in any convenient manner from the side frame members $c$ of a vehicle. The engine is disposed within an enclosure formed generally of a hood and the dust pan $d$. The side walls of the hood are removed in the interest of clearness, but may comprise extensions of the top of the hood. In the illustrated embodiment this top is formed by the longitudinally extending lubricant containing channel or housing $j$ for the cam shaft by which the valves of the cylinders are actuated. The side walls extend from this housing downwardly to a horizontal floor $b'$ formed integral with the crank case and dividing the engine compartment into an upper air cooled chamber and a lower chamber not so cooled. Forwardly the engine compartment is completed by a front end member $e$ formed with an aperture $e'$ through which air relied upon to cool the engine may enter as the vehicle moves forward or through which it may be drawn by a fan driven from the engine, if desired, and disposed within a fan housing $f'$ $f^4$ whereof the inlet is disposed proximate the aperture $e'$ to receive the air entering therethrough and whereof the outlet or open side $f^2$ faces the engine whereby the air from the fan $f$ may be directed over the engine to cool the same.

The aperture $e'$ is shown as covered by a screen $e^2$. Obviously other means may be availed of as a substitute for or in lieu of the screen $e^2$, such as louvers or the like.

The air entering the opening $e'$ through the forward motion of the vehicle or under the influence of the fan $f$ or both is under a degree of pressure within the engine compartment greater than that of the surrounding atmosphere. It is proposed to utilize this air for the engine carbureter $g$ from which the combustible mixture is conducted to the cylinders through the manifold $i$. Accordingly, the main intake $g'$ of the carbureter is connected with the compartment in the vicinity of the opening $e$. This is preferably accomplished by spacing the fan housing $f'$ from the opening $e$ and disposing the lower face $f^3$ so that there is a space $h$ below the fan housing through which the air entering through the opening $e'$ may enter a conduit $l$ communicating with the main air intake of the carbureter. Preferably a double stage centrifugal fan is disposed in the conduit leading to the carbureter to further compress the air. Such fan may, if desired, be driven from the engine and may be contained within a housing $k$ whereof the air inlet $k'$ communicates with the passage $h$ through an aperture $b^2$ formed in the floor $b'$ and whereof the air outlet communicates with the main air intake of the carbureter through a conduit $l$. This conduit may be made flexible in the interest of ease of assembly and practicability in use. The carbureter may also be provided with an auxiliary or supplemental air intake $g^2$ suitably controlled.

It will thus be seen that there has been provided a construction wherein cooling air entering the enclosure of an internal combustion engine under some degree of pressure may be availed of for the carbureter of the engine and may be subjected to a further compression dependent upon the requirements of the engine by means of an air pump.

The invention is not to be deemed limited to an air cooled engine nor to use in a vehicle, but is applicable in respect of any type of engine whether stationary or in a conveyance and any type of air compressor may be utilized, if desired, to increase the compression of the air drawn into the engine compartments and modifications of the construction and arrangement of parts may be availed of within the scope of the appended claims.

What we claim is:

1. In combination with an air cooled internal combustion engine, an enclosure for the engine having an opening in one end, a fan disposed within the enclosure between the opening and the engine to draw air through the opening and direct it over the engine, a carbureter having an air intake, means to conduct the mixture from the carbureter to the engine, an air compressor, means to conduct air drawn through the opening by said fan to the compressor, and means to conduct air from the compressor to the carbureter.

2. In a conveyance, an engine compartment including a floor, an internal combustion engine disposed partly within the compartment, a carbureter disposed below the floor, means to conduct the mixture from the carbureter to the engine, an opening in the compartment, a fan to draw air through the opening, a fan housing to direct part of the air over the engine, a deflector to divert some of the air entering the opening, said floor being formed with an opening adjacent the deflector, an air pump disposed below the floor and communicating with the opening therein, and a conduit from the pump to the carbureter.

This specification signed this 5th day of December A. D. 1925.

ALFRED F. MASURY.
CHARLES FROESCH.